(No Model.)

T. FLAGLER.
SPRING BED BOTTOM.

No. 323,309. Patented July 28, 1885.

Witnesses:
Orange A. Page,
Wm. G. Millar

Inventor:
Thomas Flagler

UNITED STATES PATENT OFFICE.

THOMAS FLAGLER, OF NEW SHARON, IOWA.

SPRING BED-BOTTOM.

SPECIFICATION forming part of Letters Patent No. 323,309, dated July 28, 1885.

Application filed March 20, 1884. (No model.)

*To all whom it may concern:*

Be it known that I, THOMAS FLAGLER, a citizen of the United States, residing at New Sharon, in the county of Mahaska and State of Iowa, have invented a new and useful Improvement in Spring Bed-Bottoms, of which the following is a specification.

My invention relates to improvements in spring bed-bottoms in which coiled-wire springs of the cone form are used.

The objects of my invention are, first, to make a very light, portable bed which a person can carry easily, and without difficulty place in any part of all houses, using only as much lumber as is necessary in a combined form to construct a base, dividing the same in three equal sections, which may be hinged to fold compactly, and weighing only about twenty pounds; second, I use a sufficient number of open-top springs to fill the bed, and thus obtain an elastic power that will sustain one thousand pounds; third, I link all the springs together so as to form an elastic chain in every direction, which holds the springs, all of them, in an upright position; fourth, provide an adjustable spring-bolster.

Figure 1:
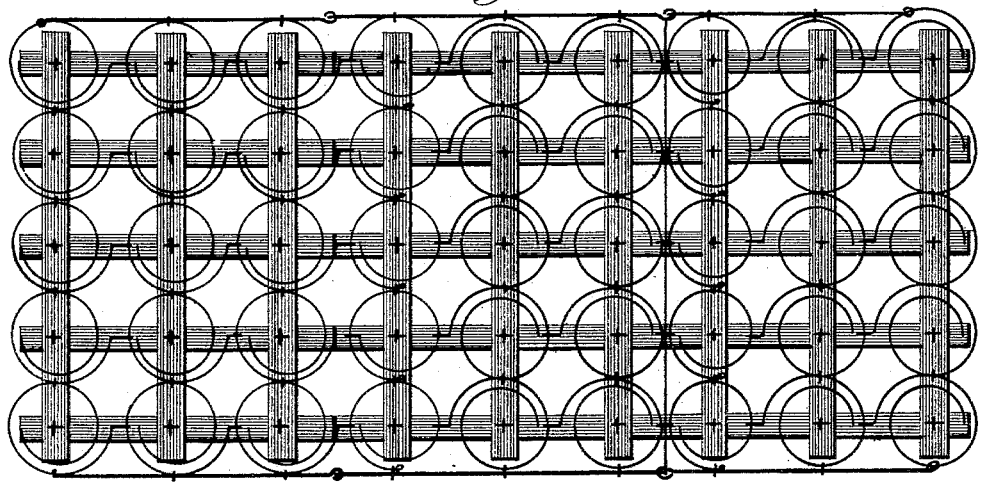
Figure 2:
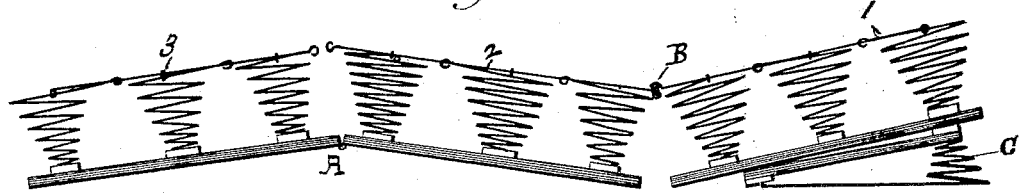
Figure 4:
Figure 3:
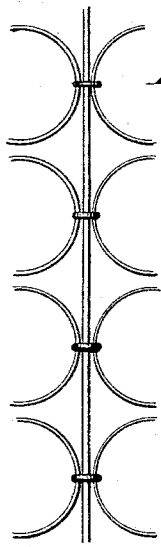
Figure 5:

Figure 1 is a plan view of my three-section folding spring bed-bottoms, showing only the upper coil of the open-top springs and their connections, and also the hinging of sections 1, 2, and 3 at A and B; Fig. 2, a side view with bolster C attached. Section 1 folds on top of section 2, and section 3 folds under section 2. Fig. 3 represents my hinge, two lines of springs coupled together with a straight wire between; Fig. 4, loose coupling lapped link open; Fig. 5, loose coupling lapped link closed.

The open-top spring, as arranged with loose couplings, operates freely and independently; consequently the weight of a little child vibrates the springs readily, and two persons of unequal weight rest comfortably on this bed together without inconveniencing each other. Many, and probably most, of the springs in use have the end of the wire turned inward and fastened to the upper coil. This destroys much of the flexibility and elasticity of the springs. My short couplings are very strong, do not stretch or break, as do long slender wires and twine, are made rapidly with machinery, and are easily and quickly attached. I construct the base of slats one and one-half inch wide and five-sixteenths of an inch thick, forming a lattice. The apex of each spring is fastened to the base at every angle where the slats cross each other. I use an open-top spring, turning the end of the wire outward, linking each spring to the next longitudinally, and couple them together transversely with my loose connecting-link, thus forming an elastic chain of coiled springs, which supports all the springs in a vertical position.

It will be noticed that a border wire is shown in Fig. 1 of the drawings, which I generally attach with short coupling.

I am aware that open-top springs are in general use in spring-beds, sofas, &c. I therefore do not claim, broadly, open-top springs; but What I do claim as my invention, and desire to secure by Letters Patent, is—

A spring bed-bottom composed of lattice-work, of wood, in three equal sections, for a base, open-top springs with loose couplings, forming an elastic top, two parallel lines of the springs being coupled by a straight wire to form a hinge, all combined and arranged substantially as and for the purposes set forth.

THOMAS FLAGLER.

Witnesses:
WILLIAM G. MILLAR,
FRANK F. EVANS.